(12) United States Patent
Signore et al.

(10) Patent No.: US 8,500,400 B2
(45) Date of Patent: Aug. 6, 2013

(54) COMPONENT HANDLING SYSTEM FOR USE IN WIND TURBINES AND METHODS OF POSITIONING A DRIVE TRAIN COMPONENT

(75) Inventors: Jonathan Paul Signore, Schenectady, NY (US); Charles Van Buchan, Greer, SC (US); Ulrich Neumann, Simpsonville, SC (US); Michael Royce Johnson, Campton, NH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/237,595

(22) Filed: Sep. 20, 2011

(65) Prior Publication Data

US 2012/0141292 A1 Jun. 7, 2012

(51) Int. Cl.
*F01D 5/14* (2006.01)
(52) U.S. Cl.
USPC ......... 416/1; 415/122.1; 416/170 R; 29/893.1
(58) Field of Classification Search
USPC ................ 29/893.1, 889.2, 426.1, 426.3, 559
See application file for complete search history.

(56) References Cited

U.S. PATENT DOCUMENTS

| | | |
|---|---|---|
| 3,665,148 A | 5/1972 | Yasenchak et al. |
| 4,039,038 A | 8/1977 | Wilhelm |
| 4,118,637 A | 10/1978 | Tackett |
| 4,239,977 A | 12/1980 | Strutman |
| 4,297,071 A | 10/1981 | Dunbar |
| 4,329,117 A | 5/1982 | Doman |
| 4,402,380 A | 9/1983 | Strong |
| 4,428,710 A | 1/1984 | Grisebach et al. |
| 4,702,668 A | 10/1987 | Carlisle et al. |
| 4,757,211 A | 7/1988 | Kristensen |
| 5,267,397 A * | 12/1993 | Wilcox .................. 29/889.2 |
| 5,269,644 A | 12/1993 | Vatel |
| 5,277,270 A | 1/1994 | Hasegawa |
| 5,459,918 A | 10/1995 | Uchida et al. |

(Continued)

FOREIGN PATENT DOCUMENTS

| | | |
|---|---|---|
| DE | 202004020317 U1 | 5/2005 |
| DE | 102004060770 B3 | 7/2006 |

(Continued)

OTHER PUBLICATIONS

Hoisting and Rigging Fundamentals, TR244C, Rev. 5, Dec. 2002, p. 52.*

*Primary Examiner* — Edward Look
*Assistant Examiner* — Aaron R Eastman
(74) *Attorney, Agent, or Firm* — James McGinniss Esq.; Armstrong Teasdale LLP

(57) ABSTRACT

A component handling system for use in a wind turbine is described herein. The wind turbine includes a rotor, a drive train assembly supported from a support frame, and a drive shaft that is rotatably coupled between the rotor and the drive train assembly. The component handling system includes a lifting assembly that is removably coupled to a component of the drive train and a lifting device. The lifting assembly is configured to support the component from the lifting device, and includes a plurality of lifting legs extending between the component and the lifting device. An alignment device is coupled to at least one lifting leg of the plurality of lifting legs, and is configured to adjust a length of the at least one lifting leg to adjust an orientation of the component with respect to the drive shaft.

18 Claims, 9 Drawing Sheets

U.S. PATENT DOCUMENTS

| | | | |
|---|---|---|---|
| 6,232,673 B1 | 5/2001 | Schoo et al. | |
| 6,408,974 B1 | 6/2002 | Viduya et al. | |
| 6,609,889 B1 | 8/2003 | Vilsboll | |
| 6,750,559 B2 | 6/2004 | Becker | |
| 6,833,632 B2 | 12/2004 | Becker et al. | |
| 6,879,055 B2 | 4/2005 | Becker et al. | |
| 7,360,310 B2 | 4/2008 | Bagepalli et al. | |
| 7,719,129 B2 | 5/2010 | Hahlbeck | |
| 7,721,434 B2 | 5/2010 | Weaver et al. | |
| 7,735,808 B2 * | 6/2010 | Viladomiu i Guarro et al. | 254/278 |
| 7,759,815 B2 | 7/2010 | Christensen | |
| 7,789,189 B2 | 9/2010 | Bigg et al. | |
| 7,836,595 B1 * | 11/2010 | Ohl, Jr. | 29/889.1 |
| 7,874,805 B2 * | 1/2011 | Pedersen | 416/204 R |
| 7,944,079 B1 * | 5/2011 | Signore et al. | 290/55 |
| 8,178,991 B2 * | 5/2012 | Smith | 290/55 |
| 2003/0071469 A1 | 4/2003 | Becker | |
| 2003/0080566 A1 | 5/2003 | Becker et al. | |
| 2005/0019166 A1 * | 1/2005 | Bervang | 416/244 A |
| 2005/0163616 A1 * | 7/2005 | Mortensen | 416/132 B |
| 2005/0280264 A1 * | 12/2005 | Nagy | 290/55 |
| 2007/0025840 A1 * | 2/2007 | Weaver et al. | 415/122.1 |
| 2008/0199309 A1 | 8/2008 | Bagepalli et al. | |
| 2008/0309091 A1 | 12/2008 | Hahlbeck | |
| 2009/0107255 A1 | 4/2009 | Jensen | |
| 2009/0149293 A1 | 6/2009 | Van Bogaert et al. | |
| 2009/0162202 A1 | 6/2009 | Nies et al. | |
| 2009/0261594 A1 * | 10/2009 | Christensen | 290/55 |
| 2010/0139062 A1 * | 6/2010 | Reed et al. | 29/23.51 |
| 2010/0254813 A1 * | 10/2010 | Dawson et al. | 416/146 R |
| 2010/0275442 A1 * | 11/2010 | Ohl, Jr. | 29/889.1 |
| 2010/0296933 A1 | 11/2010 | Hicks et al. | |
| 2010/0329867 A1 | 12/2010 | Patel et al. | |
| 2011/0072627 A1 * | 3/2011 | Ohl, Jr. | 29/239 |
| 2011/0116905 A1 * | 5/2011 | Von Kessel et al. | 414/800 |
| 2011/0133473 A1 | 6/2011 | Signore et al. | |
| 2011/0185568 A1 | 8/2011 | Weaver et al. | |
| 2011/0221215 A1 * | 9/2011 | Botwright | 294/81.4 |
| 2011/0223017 A1 * | 9/2011 | Smith | 416/1 |
| 2012/0027561 A1 * | 2/2012 | Riddell et al. | 414/800 |
| 2012/0076663 A1 * | 3/2012 | From | 416/244 R |

FOREIGN PATENT DOCUMENTS

| | | |
|---|---|---|
| EP | 1291521 A1 | 3/2003 |
| EP | 1617075 A1 | 1/2006 |
| WO | 2008059088 A1 | 5/2008 |

* cited by examiner

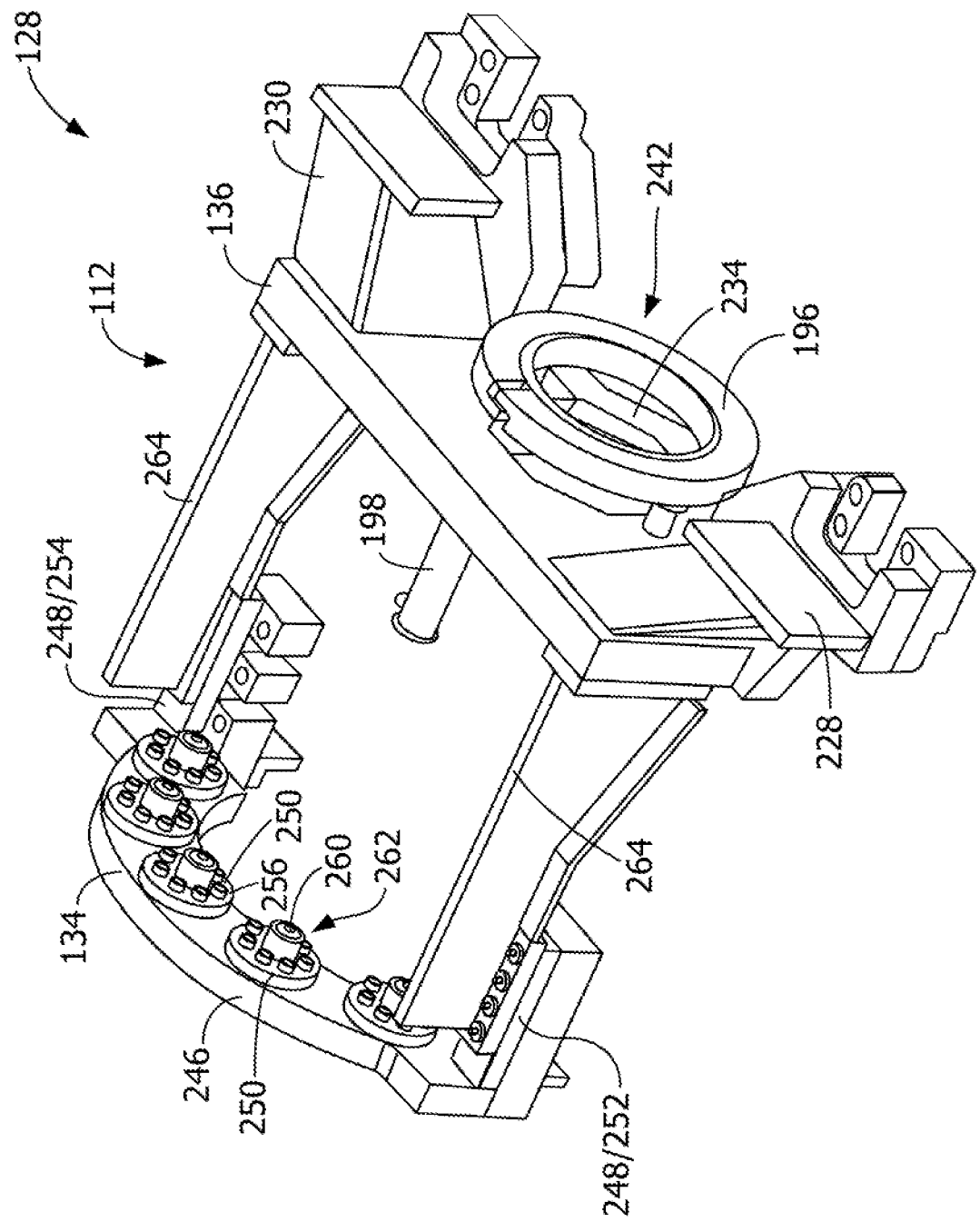

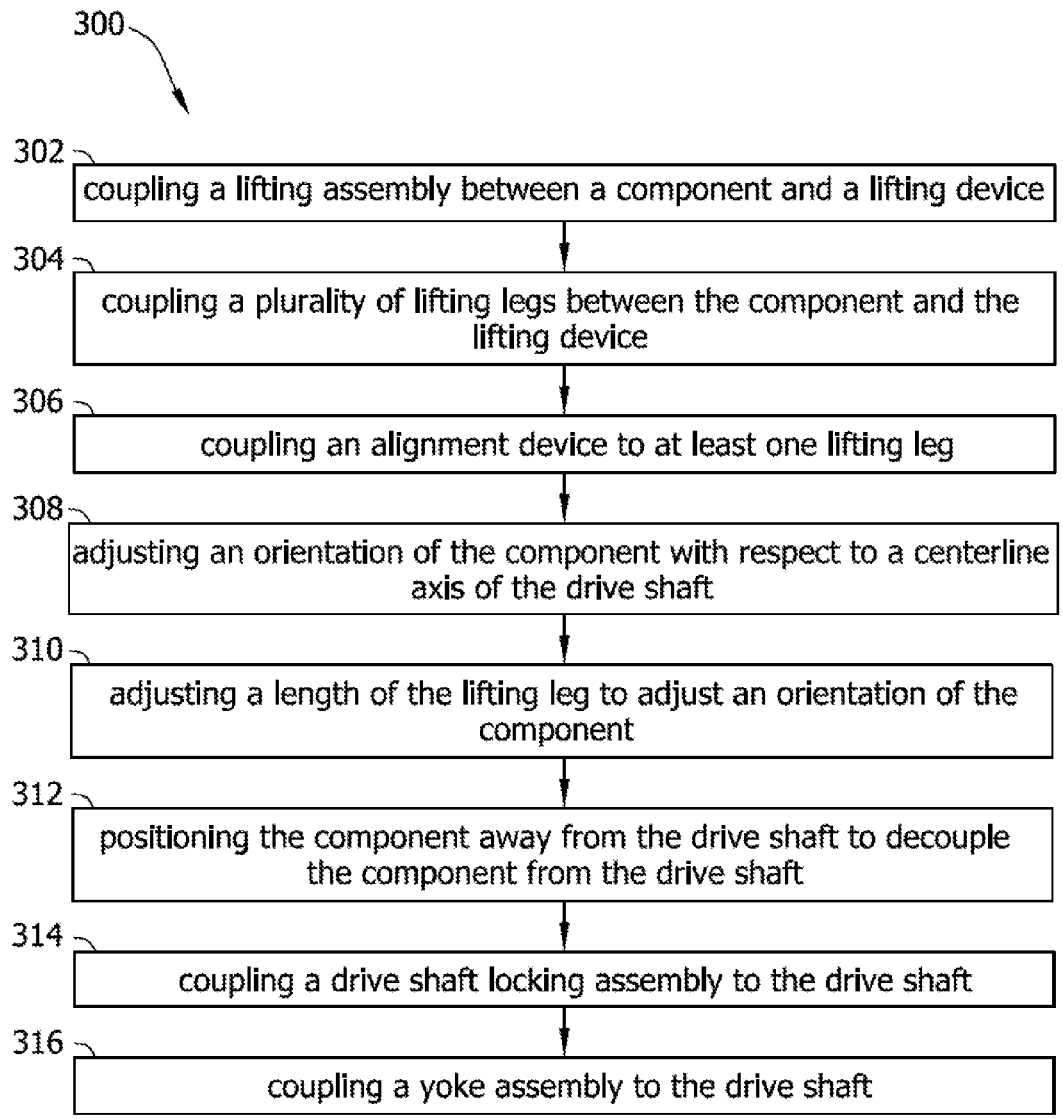

US 8,500,400 B2

COMPONENT HANDLING SYSTEM FOR USE IN WIND TURBINES AND METHODS OF POSITIONING A DRIVE TRAIN COMPONENT

BACKGROUND OF THE INVENTION

The subject matter described herein relates generally to wind turbines, and more specifically, to a component handling system for use in removing a component of a drive train assembly from the wind turbine.

At least some known wind turbines include a nacelle fixed atop a tower, a drive train assembly positioned within the nacelle, and a rotor assembly coupled to the drive train assembly with a rotor shaft. At least some known drive train assemblies include a gearbox that is coupled to the drive shaft, and a generator coupled to the gearbox. In known rotor assemblies, a plurality of blades extend from a rotor, and are each oriented such that wind passing over the blades turns the rotor and rotates the shaft, thereby driving the generator to generate electricity.

Because many known wind turbines provide electrical power to utility grids, at least some wind turbines have larger components (e.g., rotors in excess of thirty-meters in diameter) that facilitate supplying greater quantities of electrical power. However, the larger components are often subjected to increased loads (e.g., asymmetric loads) that result from wind shears, yaw misalignment, and/or turbulence, and the increased loads have been known to contribute to significant fatigue cycles on the drive train components, i.e., the gearbox and/or the generator. Over time, the drive train components may become worn and/or damaged. In at least some known wind turbines, a repair and/or replacement of the drive train component requires the rotor assembly to be removed from the drive shaft, and the nacelle, drive shaft, gearbox, and generator to be removed from the wind turbine tower prior to removing the component from the drive shaft and repairing and/or replacing the damaged component. In some wind turbines, the blades are between 60 and 100 meters in length, and as such, repairing worn or damaged drive train components can be costly and time-consuming.

BRIEF DESCRIPTION OF THE INVENTION

In one aspect, a component handling system for use in a wind turbine is provided. The wind turbine includes a rotor, a drive train assembly supported from a support frame, and a drive shaft that is rotatably coupled between the rotor and the drive train assembly. The component handling system includes a lifting assembly that is removably coupled to a component of the drive train and a lifting device. The lifting assembly is configured to support the component from the lifting device, and includes a plurality of lifting legs extending between the component and the lifting device. Each lifting leg of the plurality of lifting legs includes a first end, an opposite second end, and a length defined therebetween. An alignment device is coupled to at least one lifting leg of the plurality of lifting legs, and is configured to adjust a length of the at least one lifting leg to adjust an orientation of the component with respect to the drive shaft.

In another aspect, a component handling system for use in a wind turbine is provided. The wind turbine including a rotor, a drive train assembly supported from a support frame, and a drive shaft rotatably coupled between the rotor and the drive train assembly. The component handling system is removably coupled to a component of the drive train and a lifting device, and is configured to adjust an orientation of the component within multiple planes to facilitate removing the component from the wind turbine without removing the rotor from the wind turbine.

In yet another aspect, a method of maintaining a drive train assembly of a wind turbine is provided. The wind turbine includes a drive shaft at least partially inserted through a component of the drive train assembly. The method includes coupling a lifting assembly to the component and a lifting device such that the component is at least partially supported by the lifting device. An orientation of the component with respect to a centerline axis of the drive shaft is adjusted to facilitate decoupling the component from the drive shaft. The component is positioned along the centerline axis and away from the drive shaft to decouple the component from the drive shaft.

BRIEF DESCRIPTION OF THE DRAWINGS

FIG. 8 is another perspective view of a portion of the component handling system shown in FIG. 6.

FIG. 9 is a flow chart of an exemplary method that may be used to maintain components of the wind turbine shown in FIG. 1.

DETAILED DESCRIPTION OF THE INVENTION

The exemplary methods and systems describe herein overcome at least some disadvantages of known wind turbines by providing a component handling system that is configured to remove and/or replace a drive train component uptower of a wind turbine. Moreover, the component handling system described herein includes a lifting assembly that is adapted to be coupled to a drive train component, and is configured to remove the component from a drive shaft without requiring the drive shaft and/or a rotor to be removed from the wind turbine. In addition, the component handling system includes a shaft support assembly coupled to the drive shaft to facilitate limiting a movement of the drive shaft such that the component may be decoupled from the drive shaft without removing the rotor from the drive shaft. By providing a component handling system that enables a drive train component to be coupled and/or decoupled from the drive shaft uptower of the wind turbine, the need for large lifting cranes is reduced. As such, the cost and manpower required to remove and/or replace the drive train component is significantly reduced.

As used herein, the term "uptower" is intended to be representative of any location of the wind turbine that is above a top portion of a wind turbine tower, for example, any location within or outside of the nacelle and/or rotor while the nacelle and/or rotor are coupled to the top portion of the wind turbine tower.

Figure 1:
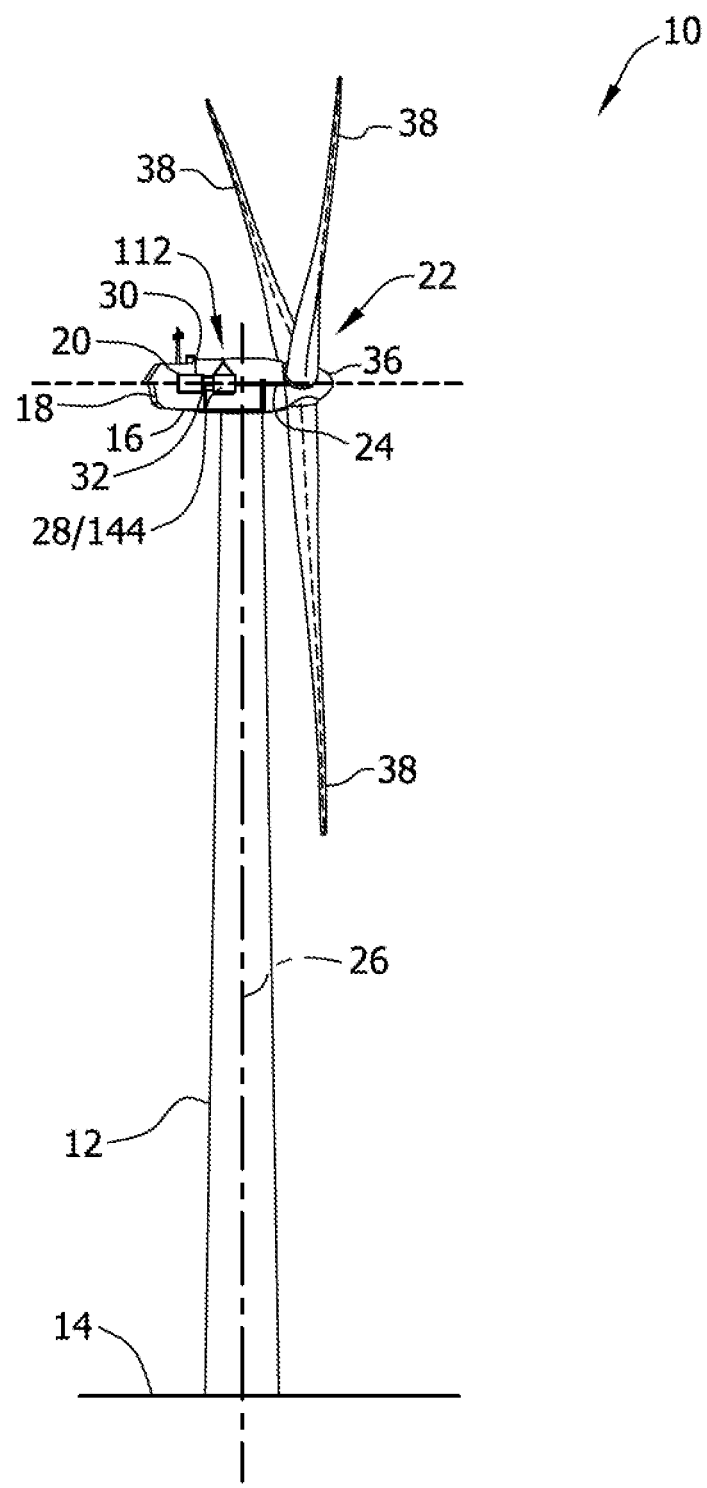
FIG. 1 is a perspective view of an exemplary wind turbine.
Figure 2:
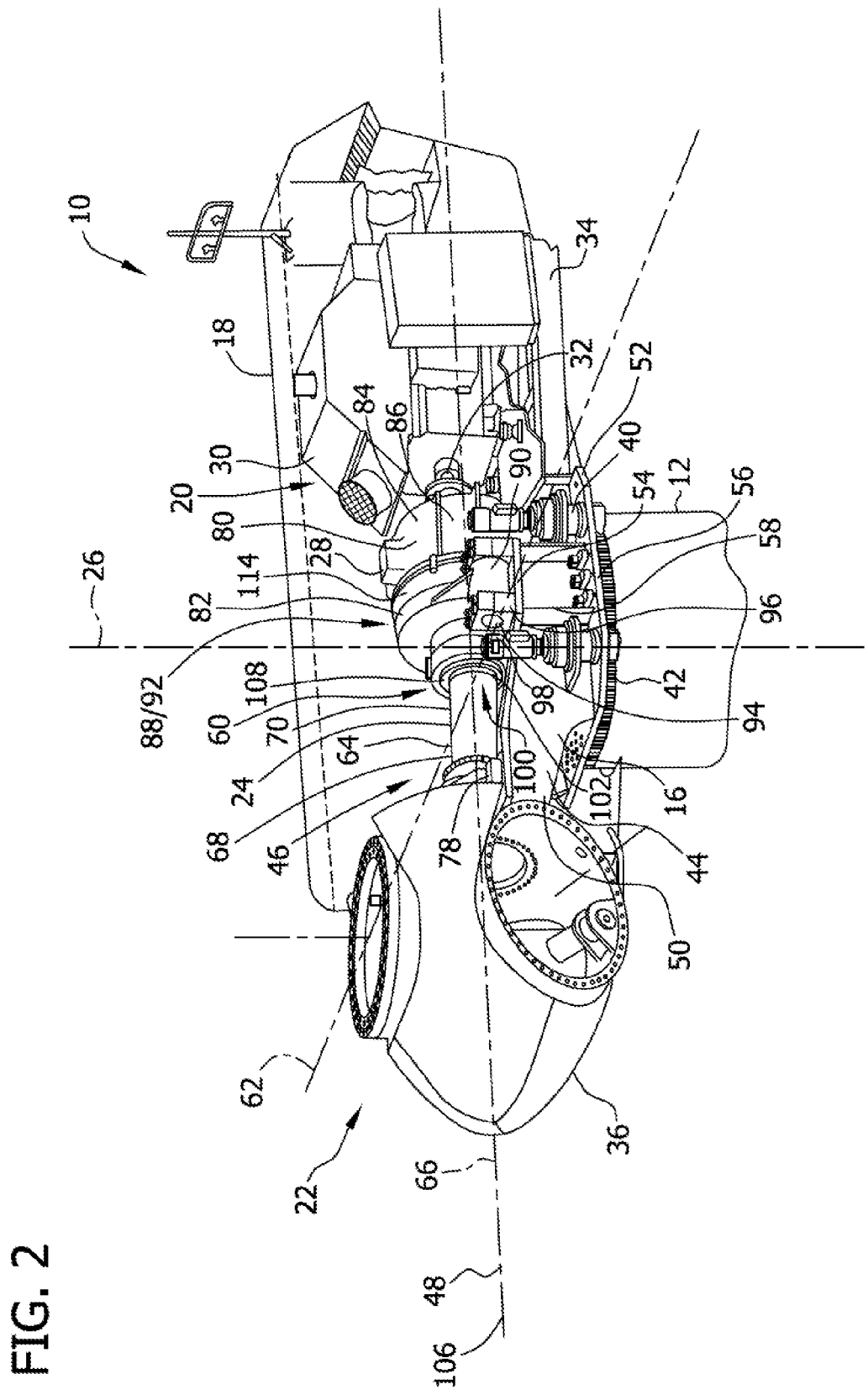
FIG. 2 is an enlarged perspective view of a portion of the wind turbine shown in FIG. 1.

FIG. 1 is a perspective view of an exemplary wind turbine 10. FIG. 2 is an enlarged perspective view of a portion of wind turbine 10. In the exemplary embodiment, wind turbine 10 is a horizontal-axis wind turbine. Alternatively, wind turbine 10 may be a vertical-axis wind turbine. In the exemplary embodiment, wind turbine 10 includes a tower 12 that extends from a supporting surface 14, a support frame 16 mounted on tower 12, a nacelle 18 coupled to support frame 16, a drive train assembly 20 mounted to support frame 16 and positioned within nacelle 18, and a rotor 22 that is rotatably coupled to drive train assembly 20 with a drive shaft 24. Tower 12 extends along a centerline axis 26 between supporting surface 14 and nacelle 18. In the exemplary embodiment, drive train assembly 20 includes a gearbox 28 that is coupled to drive shaft 24, a generator 30 coupled to gearbox 28, and a high speed shaft 32 that is coupled between gearbox 28 and generator 30. In an alternative embodiment, drive train assembly 20 does not include gearbox 28, and rotor 22 is rotatably coupled to generator 30 with drive shaft 24. In the exemplary embodiment, a generator frame 34 is coupled to support frame 16 such that generator frame 34 is cantilevered from support frame 16. Generator 30 is coupled to generator frame 34 such that generator 30 is supported from support frame 16 with generator frame 34. In such an embodiment, wind turbine 10 does not include generator frame 34, and generator 30 is mounted to support frame 16.

Rotor 22 includes a rotatable hub 36 that is coupled to drive shaft 24, and at least one rotor blade 38 coupled to and extending outwardly from hub 36. Wind turbine 10 also includes a yaw drive assembly 40 for rotating rotor 22 about tower axis 26. A yaw bearing 42 is coupled between tower 12 and support frame 16 and is configured to rotate support frame 16 with respect to tower 12 about tower axis 26. Yaw drive assembly 40 is coupled to support frame 16 and to yaw bearing 42 to facilitate rotating support frame 16 and rotor 22 about tower axis 26 to control the perspective of rotor blades 38 with respect to a direction of the wind. Nacelle 18, drive train assembly 20, drive shaft 24, and yaw drive assembly 40 are each mounted to support frame 16 for supporting nacelle 18, drive train assembly 20, drive shaft 24, rotor 22, and yaw drive assembly 40 from tower 12.

In the exemplary embodiment, rotor 22 includes three rotor blades 38. In an alternative embodiment, rotor 22 includes more or less than three rotor blades 38. Rotor blades 38 are spaced about hub 36 to facilitate rotating rotor 22 to enable kinetic energy to be transferred from the wind into usable mechanical energy, and subsequently, electrical energy. In the exemplary embodiment, each rotor blade 38 has a length ranging from about 30 meters (m) (99 feet (ft)) to about 120 m (394 ft). Alternatively, rotor blades 38 may have any suitable length that enables wind turbine 10 to function as described herein. For example, other non-limiting examples of rotor blade lengths include 10 m or less, 20 m, 37 m, or a length that is greater than 120 m.

Support frame 16 includes a first sidewall 44 and an opposite second sidewall 46 each extending along a longitudinal axis 48 between a front section 50 and a rear section 52. First sidewall 44 and second sidewall 46 each include a top plate 54 and a bottom plate 56. A first pedestal assembly 58 is coupled to first sidewall 44 and extends between top plate 54 and bottom plate 56. A second pedestal assembly 60 is coupled to second sidewall 46 and extends between top plate 54 and bottom plate 56. Second pedestal assembly 60 is aligned with first pedestal assembly 58 along a transverse axis 62 that is perpendicular to longitudinal axis 48. First pedestal assembly 58 and second pedestal assembly 60 are each positioned between front section 50 and rear section 52.

In the exemplary embodiment, drive shaft 24 includes a substantially cylindrical body 64 that extends along a centerline axis 66 between a first end 68 and a second end 70. First end 68 is coupled to rotor 22. Second end 70 is coupled to gearbox 28. Drive shaft 24 also includes a rotor flange 72 (shown in FIG. 6) that is fixedly coupled to first end 68. Hub 36 is coupled to rotor flange 72 such that a rotation of rotor 22 facilitates rotating drive shaft 24 about shaft axis 66. Drive shaft 24 also includes a rotor locking member 74 (shown in FIG. 6) coupled to drive shaft 24 to facilitate limiting a rotation of drive shaft 24. In the exemplary embodiment, rotor locking member 74 extends outwardly from first end 68, and includes a plurality of openings 76 (shown in FIG. 6) that extend though, and are oriented circumferentially about, rotor locking member 74. Each opening 76 extends through rotor locking member 74 and is sized and shaped to receive a low speed rotor lock assembly (not shown) therein. The low speed rotor lock assembly is coupled to support frame 16 and is configured to engage rotor locking member 74 to facilitate preventing a rotation of drive shaft 24 during low wind speed conditions.

Wind turbine 10 also includes at least one shaft support bearing 78 that is coupled to support frame 16 and is sized and shaped to receive drive shaft 24 therethrough. In the exemplary embodiment, shaft support bearing 78 is coupled to first end 68 of drive shaft 24 near hub 36, and is configured to facilitate radial support and alignment of drive shaft 24. Shaft support bearing 78 is coupled to front section 50 of support frame 16 and extends along transverse axis 62 between first sidewall 44 and second sidewall 46. Drive shaft 24 extends through shaft support bearing 78 and is supported by shaft support bearing 78 and gearbox 28. In the exemplary embodiment, rotor 22 is coupled to drive shaft 24 such that rotor 22 is supported by shaft support bearing 78 and by gearbox 28 with drive shaft 24.

In the exemplary embodiment, gearbox 28 includes a gearbox casing 80 that extends along longitudinal axis 48 between a forward portion 82 and an aft portion 84, and that extends along transverse axis 62 between a first side 86 and an opposite second side 88. Gearbox 28 also includes a first torque arm 90 and a second torque arm 92 that is opposite first torque arm 90. First torque arm 90 and second torque arm 92 each extend radially outwardly from casing 80. First torque arm 90 and second torque arm 92 each include a torque pin 94 that extends outwardly from torque arms 90 and 92, respectively.

First torque arm 90 is coupled to first pedestal assembly 58, and second torque arm 92 is coupled to second pedestal assembly 60 to facilitate supporting gearbox 28 from support frame 16. More specifically, a plurality of pillow block assemblies 96 are coupled between first torque arm 90 and first pedestal assembly 58, and between second torque arm 92 and second pedestal assembly 60. In addition, each pillow block assembly 96 includes an opening 98 that is sized to receive a corresponding torque pin 94 therethrough to couple gearbox 28 to support frame 16. During removal of gearbox 28 from wind turbine 10, pillow block assemblies 96 are decoupled from torque arms 90 and 92 to enable gearbox 28 to be positioned with respect to drive shaft 24.

In the exemplary embodiment, gearbox 28 includes an opening 100 that extends through forward portion 82 of casing 80. An input shaft 102 is positioned within opening 100 and is configured to receive second end 70 of drive shaft 24. Moreover, input shaft 102 includes a substantially circular inner surface 104 (shown in FIG. 3) that defines opening 100 that extends along a centerline axis 106. Opening 100 is sized and shaped to receive drive shaft 24 therein such that gearbox axis 106 is oriented coaxially with drive shaft axis 66. A shrink disk 108 is coupled to input shaft 102 and extends radially outwardly from input shaft 102 such that input shaft 102 is between shrink disk 108 and drive shaft 24. Shrink disk 108 is configured to compress input shaft 102 about an outer surface 110 (shown in FIG. 3) of drive shaft 24 to facilitate coupling input shaft 102 to drive shaft 24 via a friction fit.

In the exemplary embodiment, wind turbine 10 also includes a component handling system 112 that is adapted to be coupled to a drive train component 114 such as, for example, gearbox 28 and/or generator 30, to facilitate maintaining, removing, and/or installing component 114 within nacelle 18 uptower of wind turbine 10. In addition, component handling system 112 is configured to support component 114 from a lifting device 116 (shown in FIG. 4) such as, for example, a crane supported from supporting surface 14, a gantry crane positioned within nacelle 18, a crane coupled to tower 12, a helicopter, and/or a crane supported from a floating platform and/or floating vessel to facilitate coupling and/or decoupling component 114 from drive shaft 24.

During operation of wind turbine 10, as wind strikes rotor blades 38, rotor 22 is rotated causing a rotation of drive shaft 24 about shaft axis 66. A rotation of drive shaft 24 rotatably drives gearbox 28 that subsequently drives generator 30 to facilitate production of electrical power by generator 30. In addition, a rotation of rotor 22 rotates drive shaft 24 such that a rotational moment, represented by arrow 118 (shown in FIG. 6), is imparted from drive shaft 24 to gearbox 28. Additionally, as rotor 22 is supported from shaft support bearing 78 with drive shaft 24, drive shaft 24 imparts an upward force, represented by arrow 120 (shown in FIG. 6), to gearbox 28. First torque arm 90 and second torque arm 92 are configured to transfer rotational moment 118 and upward force 120 from gearbox 28 to support frame 16 with first pedestal assembly 58 and second pedestal assembly 60.

Over time, drive train assembly components 114 such as, for example gearbox 28 and/or generator 30, may be damaged and need to be repaired and/or replaced. Component handling system 112 enables a user to remove and/or install component 114 uptower of wind turbine 10. In addition, component handling system 112 is configured to be coupled to component 114, to drive shaft 24, and to support frame 16 to facilitate decoupling component 114 from drive shaft 24 without removing drive shaft 24 from nacelle 18 and/or decoupling rotor 22 from drive shaft 24 and removing rotor 22 from wind turbine 10. Moreover, component handling system 112 is configured to support drive shaft 24 and rotor 22 from support frame 16, and to facilitate preventing a movement of drive shaft 24 to facilitate coupling and/or decoupling component 114 from drive shaft 24. By supporting rotor 22 and drive shaft 24 from support frame 16, component handling system 112 facilitates coupling and/or decoupling component 114 from drive shaft 24 with rotor 22 coupled to, and supported from, drive shaft 24.

Figure 3:
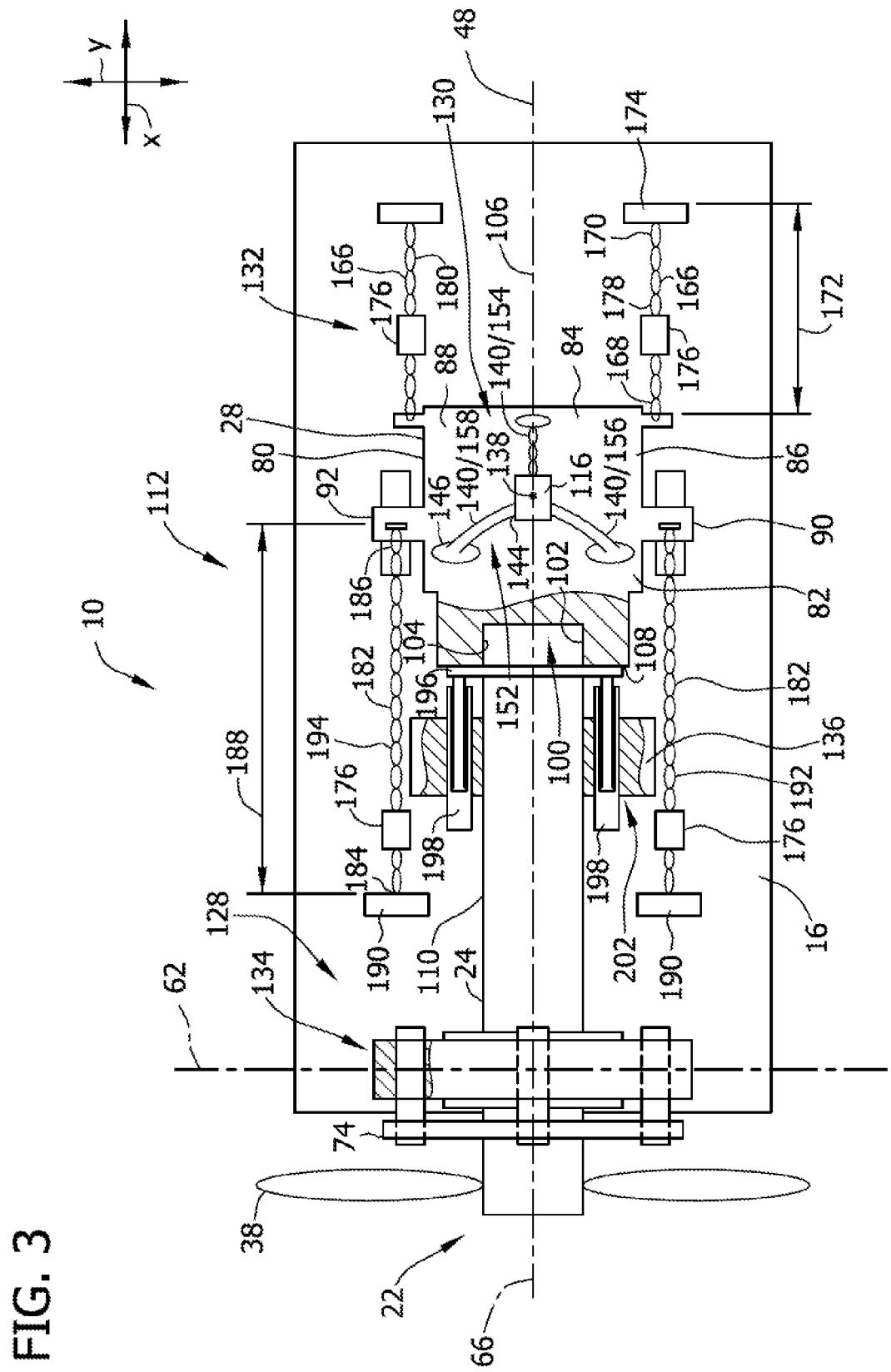
FIG. 3 is schematic top view of an exemplary component handling system that may be used with the wind turbine shown in FIG. 1.
Figure 4:
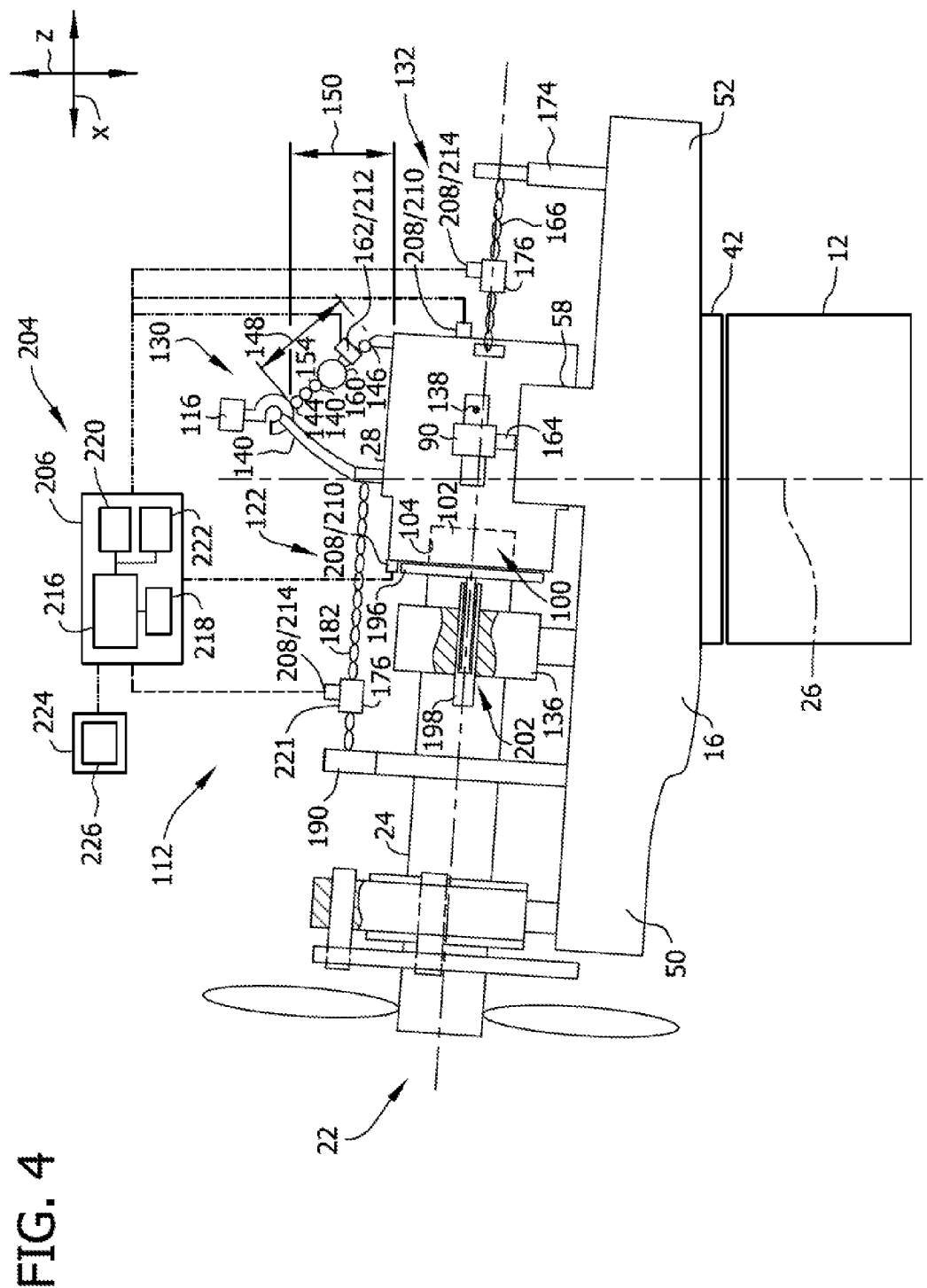
FIG. 4 is a schematic side view of the component handling system shown in FIG. 3 in a first position.
Figure 5:
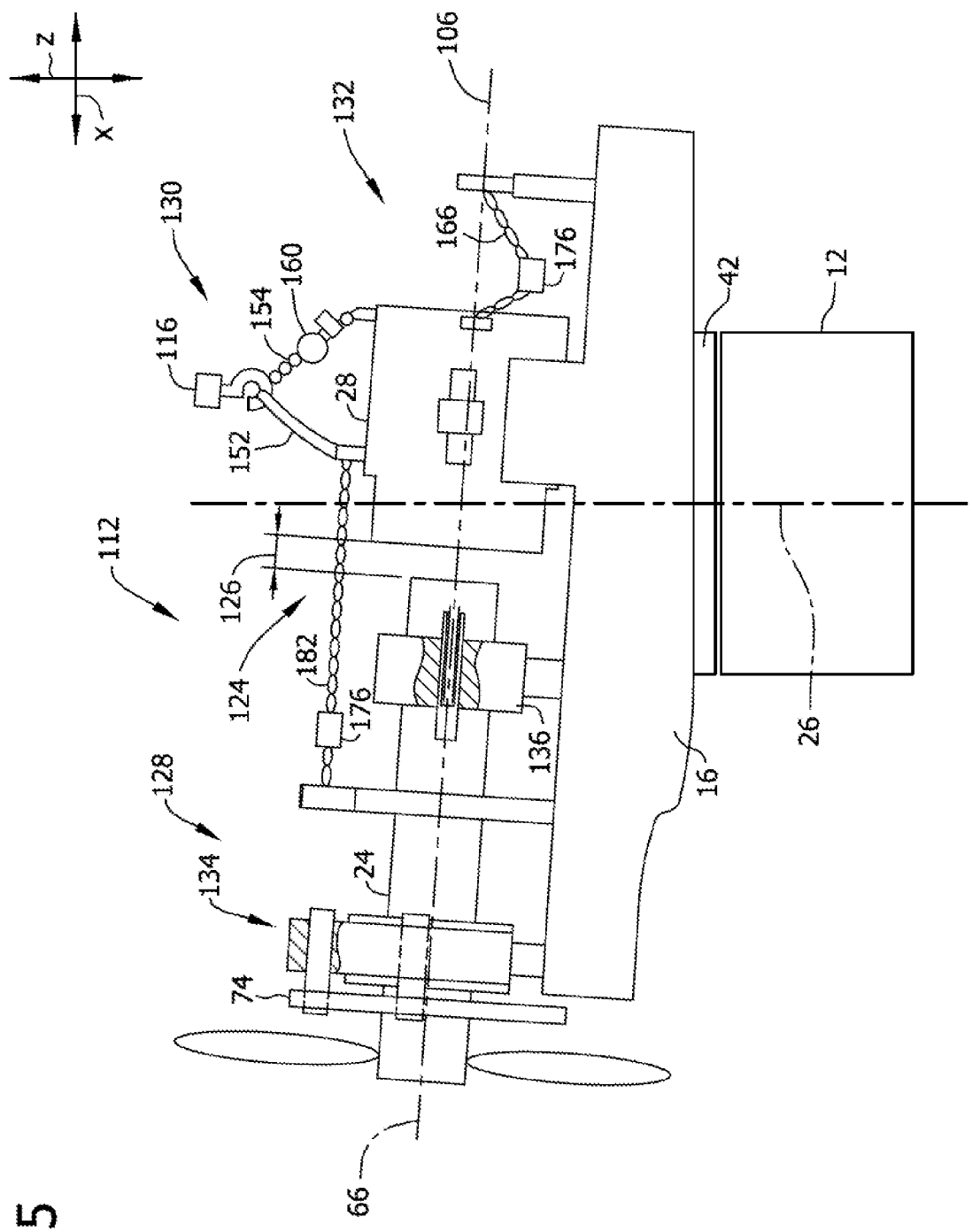
FIG. 5 is a schematic side view of the component handling system shown in FIGS. 3 and 4 in a second position.

FIG. 3 is schematic top view of component handling system 112. FIG. 4 is a schematic side view of component handling system 112 shown in a first position. FIG. 5 is a schematic side view of component handling system 112 shown in a second position. Identical components shown in FIGS. 3-5 are identified using the same reference numbers used in FIGS. 1-2. In the exemplary embodiment, three perpendicular axes X, Y, and Z are used to define a three-dimensional Cartesian coordinate system relative to gearbox 28. Specifically, the X-axis is oriented to extend substantially coaxially along longitudinal axis 48, the Y-axis is oriented to extend substantially coaxially along transverse axis 62, and the Z-axis is oriented in a vertical direction, and substantially coaxially with tower axis 26. In the exemplary embodiment, component handling system 112 is configured to selectively position component 114 such as, for example, gearbox 28 at a first position 122 (shown in FIG. 4), at a second position 124 (shown in FIG. 5), and at any position therebetween. In first position 122, gearbox 28 is operatively coupled to drive shaft 24 such that drive shaft 24 is at least partially inserted into gearbox opening 100 and through input shaft 102. In second position 124, gearbox 28 is operatively decoupled from drive shaft 24 and spaced a distance 126 along longitudinal axis 48 from drive shaft 24. In second position 124, drive shaft 24 is not in contact with gearbox 28, and gearbox 28 may be removed from wind turbine 10 without removing drive shaft 24 from nacelle 18 and/or uncoupling rotor 22 from drive shaft 24 and removing rotor 22 from wind turbine 10.

In the exemplary embodiment, component handling system 112 includes a shaft support assembly 128, a lifting assembly 130, and a positioning assembly 132. Shaft support assembly 128 is removably coupled to drive shaft 24 and to support frame 16 to facilitate limiting a movement of drive shaft 24. In the exemplary embodiment, shaft support assembly 128 includes a drive shaft locking assembly 134 and a restraint assembly 136. Shaft locking assembly 134 is adapted to be coupled to support frame 16 and to rotor locking member 74 to facilitate limiting a rotation of drive shaft 24 about drive shaft axis 66. In addition, restraint assembly 136 is adapted to be coupled to support frame 16 and to drive shaft 24 to facilitate limiting an upward movement of drive shaft 24. In an alternative embodiment, component handling system 112 does not include shaft support assembly 128.

Lifting assembly 130 is removably coupled between gearbox 28 and lifting device 116 to support gearbox 28 from lifting device 116. In the exemplary embodiment, lifting device 116 is oriented with respect to a center of gravity 138 of gearbox 28, and is configured to move gearbox 28 bi-directionally along the Z-axis, and to move gearbox 28 along the X-axis and/or the Y-axis to selectively position gearbox 28 within the X-Y reference plane. In the exemplary embodiment, lifting assembly 130 includes a plurality of lifting legs 140. Each lifting leg 140 extends between lifting device 116 and gearbox 28. Moreover, each lifting leg 140 includes a first end 144 and a second end 146, and has a length 148 defined between first end 144 and second end 146. First end 144 is coupled to lifting device 116, and second end 146 is coupled to gearbox 28. At least one lifting leg 140 includes an adjustable length 148 to facilitate adjusting an orientation of gearbox 28, and to facilitate adjusting a distance 150 measured along tower axis 26 between lifting device 116 and gearbox 28. In the exemplary embodiment, lifting leg 140 is a chain. Alternatively, lifting leg 140 may be a rod, a rope, a strap, a cable, and/or any suitable device that enables lifting assembly 130 to function as described herein.

In the exemplary embodiment, lifting assembly 130 includes a plurality of forward lifting legs 152 and one or more aft lifting legs 154. Each forward lifting leg 152 extends between lifting device 116 and casing forward portion 82. In the exemplary embodiment, a first forward lifting leg 156 extends between lifting device 116 and gearbox first side 86, and a second forward lifting leg 158 extends between lifting device 116 and gearbox second side 88. At least one aft lifting leg 154 extends between lifting device 116 and gearbox aft portion 84, and is oriented with respect to gearbox axis 106.

Lifting assembly 130 also includes an alignment device 160 coupled to aft lifting leg 154 to adjust an orientation of gearbox 28 with respect to drive shaft 24. In addition, alignment device 160 is configured to adjust an amount of load such as, for example, an amount of weight being supported by lifting assembly 130 and/or lifting device 116. Moreover, alignment device 160 is configured to adjust a length 148 of aft lifting leg 154 to facilitate rotating gearbox 28 about center of gravity 138, and within the X-Z reference plane to adjust an orientation of input shaft 102 with respect to drive shaft 24 to facilitate coupling and/or decoupling drive shaft 24 to gearbox 28. In the exemplary embodiment, alignment device 160 includes a chain fall hoist assembly. Alternatively, alignment device 160 may include a come-along winch assembly, a hydraulic cylinder assembly, a motorized winch assembly, or any suitable device that enables lifting assembly 130 to function as described herein. Lifting assembly 130 also includes a load cell sensor 162 coupled to at least one lifting leg 140 for sensing an amount of load supported from lifting assembly 130 and/or lifting device 116. In one embodiment, load cell sensor 162 is configured to measure an amount of load being supported by lifting assembly 130, and transmit an audible and/or visible alarm when the measured load is equal to, or greater than, a predefined load such as, for example, a rated load capacity of lifting assembly 130 and/or lifting device 116.

In the exemplary embodiment, lifting assembly 130 also includes a plurality of hydraulic lifting cylinders 164 that are removably mounted between pedestal assemblies 58 and 60 and torque arms 90 and 92, respectively. Lifting cylinders 164 are configured to at least partially support gearbox 28 from support frame 16. In one embodiment, lifting cylinders 164 are also configured to adjust an orientation of gearbox 28 about gearbox axis 106.

Positioning assembly 132 is coupled to gearbox 28 to move gearbox 28 with respect to drive shaft 24. More specifically, positioning assembly 132 is coupled to gearbox 28 and support frame 16, and is configured to adjust a position of gearbox 28 between first position 122 and second position 124. In the exemplary embodiment, positioning assembly 132 includes at least one aft positioning member 166 that is coupled to component aft portion 84, and is configured to bias gearbox 28 along longitudinal axis 48 away from drive shaft 24 and towards generator 30. Alternatively, aft positioning member 166 may be configured to bias gearbox 28 towards drive shaft 24.

In the exemplary embodiment, aft positioning member 166 extends between a first end 168 and a second end 170, and includes a length 172 defined between first end 168 and second end 170. In the exemplary embodiment, first end 168 is coupled to aft portion 84, and second end 170 is coupled to support frame 16. In one embodiment, second end 170 is coupled to a support flange 174 that extends outwardly from support frame 16. Alternatively, second end 170 may be coupled to generator frame 34, generator 30, nacelle 18, and/or any suitable support structure to enable positioning assembly 132 to function as described herein. At least one aft positioning member 166 includes a positioning device 176 to adjust length 172 of aft positioning member 166 to bias gearbox 28 away from drive shaft 24.

Positioning assembly 132 includes a first aft positioning member 178, and a second aft positioning member 180. First aft positioning member 178 is coupled to gearbox first side 86, and second aft positioning member 180 is coupled to gearbox second side 88. First aft positioning member 178 and second aft positioning member 180 are each configured to bias gearbox 28 away from drive shaft 24, and to adjust an orientation of gearbox axis 106 with respect to drive shaft axis 66. Moreover, each aft positioning member 178 and 180 may be adjusted separately to facilitate rotating gearbox 28 about center of gravity 138, and within the X-Y reference plane to adjust an orientation of input shaft 102 with respect to drive shaft 24 to facilitate coupling and/or decoupling drive shaft 24 to gearbox 28.

Positioning assembly 132 also includes at least one forward positioning member 182 coupled to component forward portion 82. In the exemplary embodiment, forward positioning member 182 is configured to bias gearbox 28 along longitudinal axis 48 towards drive shaft 24. Alternatively, forward positioning member 182 may be configured to bias gearbox 28 away from drive shaft 24. In the exemplary embodiment, forward positioning member 182 extends between a first end 184 that is coupled to support frame 16, and a second end 186 that is coupled to forward portion 82. Forward positioning member 182 also includes a length 188 defined between first end 184 and second end 186. At least one forward positioning member 182 includes a positioning device 176 to adjust length 188 of forward positioning member 182. In the exemplary embodiment, first end 184 is coupled to a forward support flange 190 that extends outwardly from support frame 16. Alternatively, first end 184 may be coupled to shaft support bearing 78, nacelle 18, shaft support assembly 128, and/or any suitable support structure to enable positioning assembly 132 to function as described herein.

In the exemplary embodiment, positioning assembly 132 also includes a first forward positioning member 192, and a second forward positioning member 194. First forward positioning member 192 is coupled to first torque arm 90, and second forward positioning member 194 is coupled to second torque arm 92. First forward positioning member 192 and second forward positioning member 194 are each configured to bias gearbox 28 towards drive shaft 24, and to adjust an orientation of gearbox axis 106 with respect to drive shaft axis 66. Moreover, each forward positioning member 192 and 194 may be adjusted separately to facilitate rotating gearbox 28 about center of gravity 138, and with respect to the X-Y reference plane to adjust an orientation of input shaft 102 with respect to drive shaft 24 to facilitate coupling and/or decoupling drive shaft 24 to gearbox 28.

In the exemplary embodiment, forward positioning member 182 and aft positioning member 166 are each formed from a chain. Alternatively, forward positioning member 182 and aft positioning member 166 may each be a rod, a rope, a strap, a cable, and/or any suitable device that enables positioning assembly 132 to function as described herein. In addition, in the exemplary embodiment, positioning device 176 includes a come-along winch assembly. Alternatively, positioning device 176 may include a chain fall hoist assembly, a hydraulic cylinder assembly, a motorized winch assembly, or any suitable device that enables positioning assembly 132 to function as described herein.

In one embodiment, positioning assembly 132 includes a push ring 196 that is coupled to gearbox 28, and at least one hydraulic cylinder actuator 198 that is coupled to push ring 196 and to shaft support assembly 128 to facilitate moving gearbox 28 along longitudinal axis 48 with respect to drive shaft 24. Push ring 196 is adapted to be coupled to shrink disk 108, and is sized and shaped to receive drive shaft 24 therethrough. Actuator 198 is coupled to restraint assembly 136 and extends through an actuator opening 202 defined through restraint assembly 136 to contact push ring 196. Push ring 196 is configured to facilitate uniformly distributing a load from actuator 198 to gearbox 28.

In the exemplary embodiment, component handling system 112 also includes a control system 204 that is operatively coupled to lifting device 116, lifting assembly 130, and/or positioning assembly 132 to selectively position gearbox 28 at first position 122, at second position 124, and at any position between first position 122 and second position 124. In the exemplary embodiment, control system 204 includes a controller 206 that is coupled in communication with a plurality of sensors 208. Each sensor 208 detects various parameters relative to the orientation and position of component 114 and drive shaft 24, and the operation of component handling system 112. Sensors 208 may include, but are not limited to only including, position sensors, vibration sensors, acceleration sensors, load sensors, and/or any other sensors that sense various parameters relative to the orientation and position of component 114 and drive shaft 24, and the operation of component handling system 112. As used herein, the term "parameters" refers to physical properties whose values can be used to define the orientation, position, and operating conditions of component 114 and drive shaft 24, such as positions, orientations, weight loading, strain loading, rotational speed, vibrations and accelerations at defined locations.

Control system 204 includes at least one first sensor 210, i.e. a position sensor, that is coupled to component 114 such as, for example, gearbox 28 for sensing an orientation of gearbox 28 with respect to drive shaft 24 and transmitting a signal indicative of the sensed orientation to controller 206. At least one second sensor 212, i.e. a load cell sensor 162 is coupled to lifting assembly 130 for sensing a weight load supported by lifting assembly 130 and/or lifting device 116, and transmitting a signal indicative of the sensed weight load to controller 206. In addition, at least one third sensor 214, i.e. a force/strain sensor, is coupled to positioning assembly 132 for sensing an axial force loading of positioning members 166 and 182 and transmitting a signal indicative of the sensed force loading to controller 206.

In the exemplary embodiment, controller 206 includes a processor 216 and a memory device 218. Processor 216 includes any suitable programmable circuit which may include one or more systems and microcontrollers, microprocessors, reduced instruction set circuits (RISC), application specific integrated circuits (ASIC), programmable logic circuits (PLC), field programmable gate arrays (FPGA), and any other circuit capable of executing the functions described herein. The above examples are exemplary only, and thus are not intended to limit in any way the definition and/or meaning of the term "processor." Memory device 218 includes a computer readable medium, such as, without limitation, random access memory (RAM), flash memory, a hard disk drive, a solid state drive, a diskette, a flash drive, a compact disc, a digital video disc, and/or any suitable device that enables processor 216 to store, retrieve, and/or execute instructions and/or data.

In the exemplary embodiment, controller 206 includes a control interface 220 that controls operation of lifting device 116, lifting assembly 130 and/or positioning assembly 132. Control interface 220 is coupled to one or more control devices 221, such as, for example, alignment device 160, positioning device 176, and/or hydraulic lifting cylinders 164. In addition, controller 206 also includes a sensor interface 222 that is coupled to at least one sensor 208 such as, for example, first, second, and third sensors 210, 212, and 214. Each sensor 208 transmits a signal corresponding to a sensed operating parameter of component 114, lifting assembly 130, and/or positioning assembly 132. Each sensor 208 may transmit a signal continuously, periodically, or only once and/or any other signal timing that enables control system 204 to function as described herein. Moreover, each sensor 208 may transmit a signal either in an analog form or in a digital form.

Controller 206 also includes a display 224 and a user interface 226. Display 224, in the exemplary embodiment, includes a vacuum fluorescent display (VFD) and/or one or more light-emitting diodes (LED). Additionally or alternatively, display 224 may include, without limitation, a liquid crystal display (LCD), a cathode ray tube (CRT), a plasma display, and/or any suitable visual output device capable of displaying graphical data and/or text to a user. In an exemplary embodiment, a component position, a component orientation, a force/strain measurement, a weight loading, and/or any other information may be displayed to a user on display 224. User interface 226 includes, without limitation, a keyboard, a keypad, a touch-sensitive screen, a scroll wheel, a pointing device, an audio input device employing speech-recognition software, and/or any suitable device that enables a user to input data into controller 206 and/or to retrieve data from controller 206. In one embodiment, user interface 226 is integrated with display 224 such that user interface 226 is accessed by a user via display 224. In the exemplary embodiment, the user may input control parameters into controller 206 using user interface 226 to control an operation of lifting device 116, lifting assembly 130, and/or positioning assembly 132 to facilitate coupling and/or decoupling component 114 from drive shaft 24, and removing component 114 from wind turbine 10.

Various connections are available between control interface 220 and control device 221, between sensor interface 222 and sensors 208, and between processor 216, memory device 218, display 224, and user interface 226. Such connections may include, without limitation, an electrical conductor, a low-level serial data connection, such as Recommended Standard (RS) 232 or RS-485, a high-level serial data connection, such as Universal Serial Bus (USB) or Institute of Electrical and Electronics Engineers (IEEE) 1394 (a/k/a FIREWIRE), a parallel data connection, such as IEEE 1284 or IEEE 488, a short-range wireless communication channel such as BLUETOOTH, and/or a private (e.g., inaccessible outside wind turbine 10) network connection, whether wired or wireless.

In the exemplary embodiment, controller 206 is configured to operate component handling system 112 to couple and/or decouple gearbox 28 from drive shaft 24. During removal of gearbox 28 from drive shaft 24, controller 206 receives a signal from first sensor 210 that is indicative of a position and orientation of gearbox 28 with respect to drive shaft 24. Controller 206 operates alignment device 160 to adjust a length of at least one lifting leg 140 to adjust an orientation of gearbox 28 with respect to drive shaft axis 66 to facilitate decoupling gearbox 28 from drive shaft 24 such that gearbox 28 can be moved with respect to drive shaft 24 without damaging drive shaft 24 and/or gearbox 28. Controller 206 also receives a signal from second sensor 212 that is indicative of the weight load supported from lifting device 116, and operates alignment device 160 and/or lifting device 116 to adjust a weight of gearbox 28 being supported from lifting device 116 such that the rated lifting capacity of lifting device 116 is within a predefined lifting range. In addition, controller 206 receives a signal from third sensor 214 that is indicative of the force/strain imparted to positioning assembly 132 from gearbox 28, and operates positioning devices 176 to adjust a length of aft positioning member 166 to bias gearbox 28 away from drive shaft 24. In addition, controller 206 operates positioning devices 176 to adjust an orientation of gearbox 28 within the X-Y plane. During operation, as controller 206 adjusts an orientation of gearbox 28 with respect to drive shaft 24, controller 206 also operates lifting device 116 to move gearbox 28 away from drive shaft 24 along longitudinal axis 48 to move gearbox 28 from first position 122 to second position 124. As gearbox 28 moves from first position 122 to second position 124, gearbox 28 is uncoupled from drive shaft 24, which reduces the amount of force required to move gearbox 28. As gearbox 28 is uncoupled from drive shaft 24, controller 206 operates positioning device 176 to increase a tension imparted to forward positioning member 182 to facilitate controlling the rate of movement of gearbox 28.

During installation of gearbox 28, controller 206 operates alignment device 160 and/or lifting device 116 to facilitate aligning gearbox 28 coaxially with drive shaft 24. Controller 206 also operates positioning devices 176 to adjust a tension imparted to forward positioning member 182 to bias gearbox 28 towards drive shaft 24, and to adjust a tension imparted to aft positioning member 166 to control the rate of advancement of gearbox 28 towards drive shaft 24.

Figure 6:
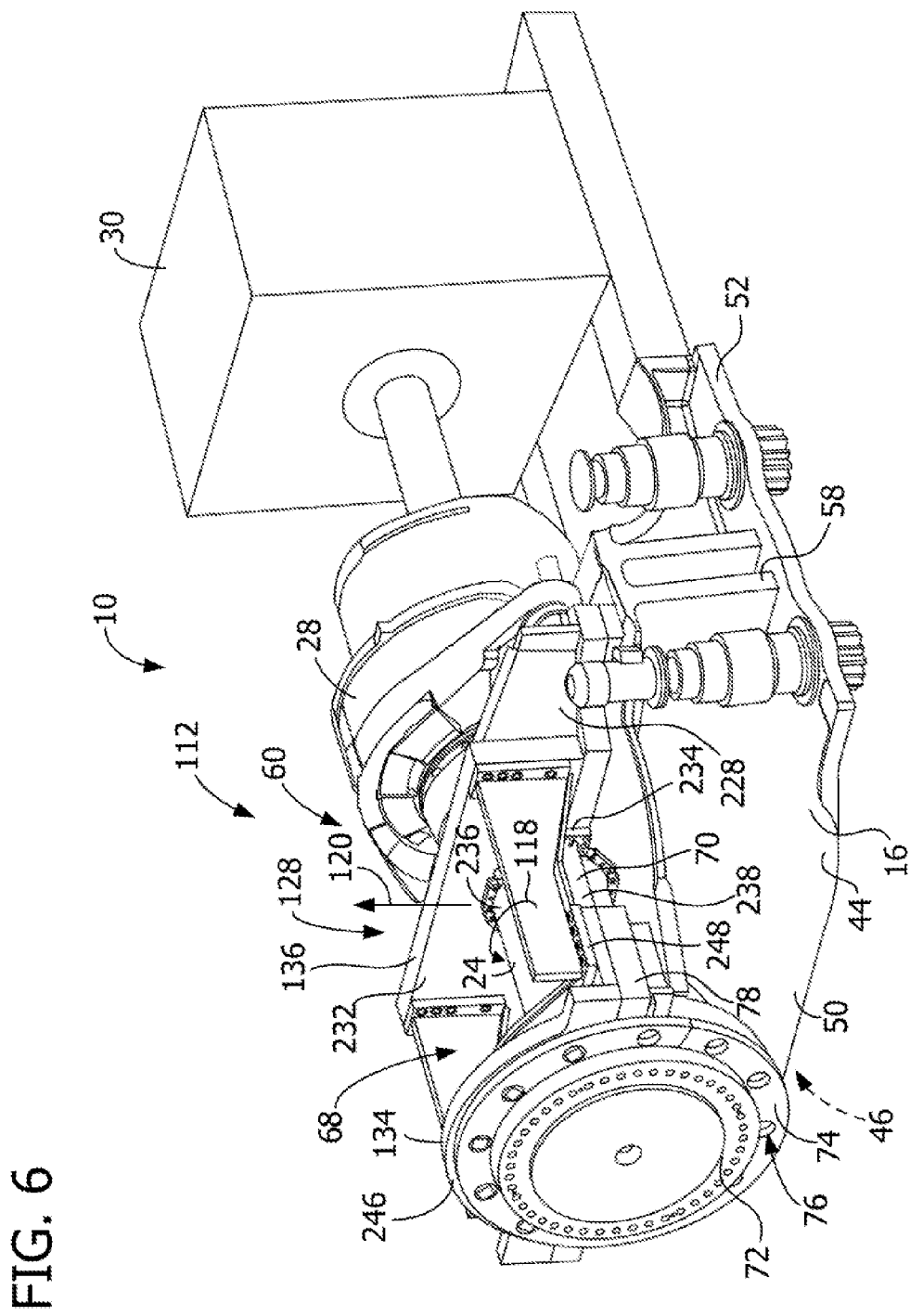
FIG. 6 is another enlarged perspective view of the wind turbine shown in FIG. 1.
Figure 7:
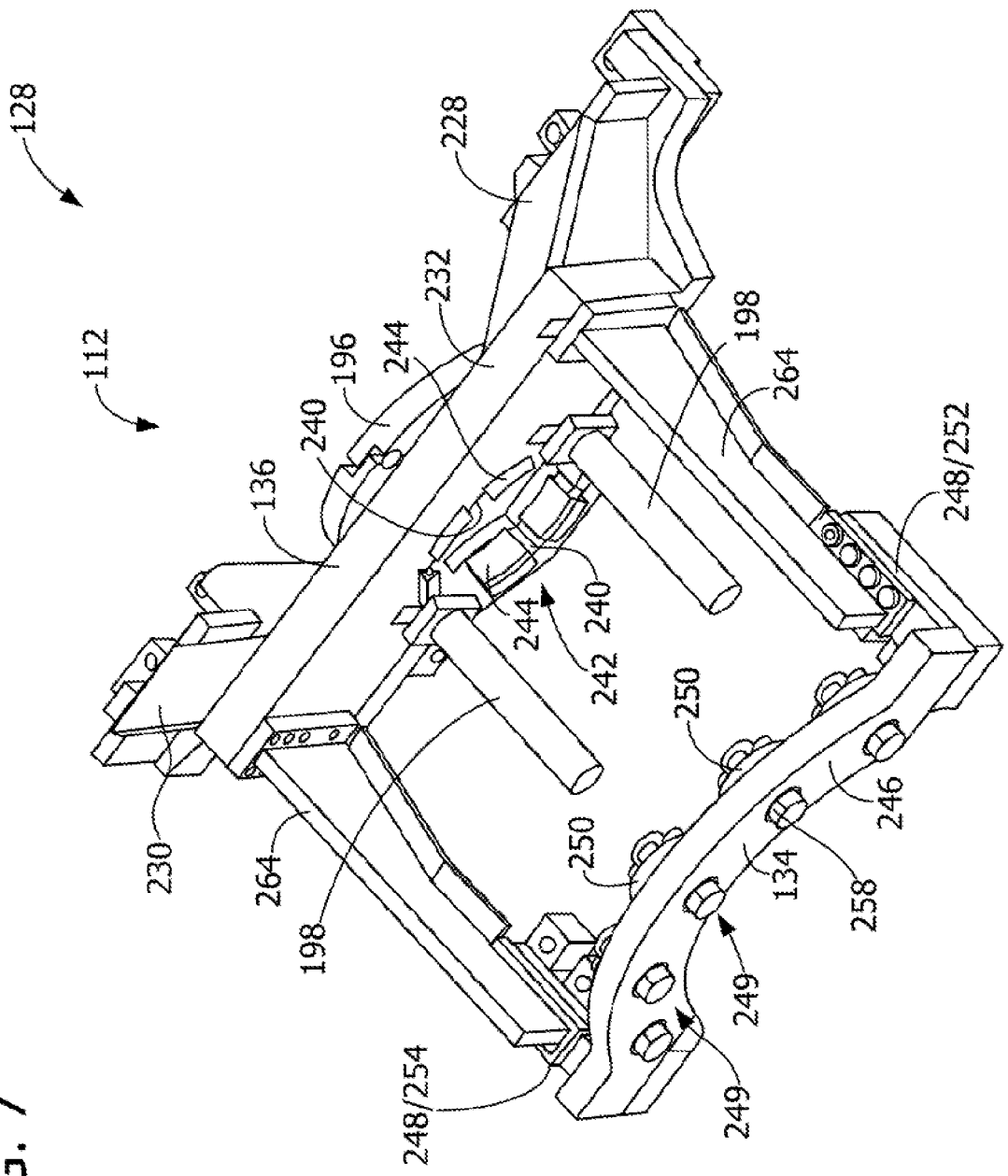
FIG. 7 is a perspective view of a portion of the component handling system shown in FIG. 6.

FIG. 6 is another enlarged perspective view of wind turbine 10. FIG. 7 is a perspective view of a portion of component handling system 112. FIG. 8 is another perspective view of a portion of component handling system 112. In the exemplary embodiment, shaft support assembly 128 is configured to facilitate limiting a rotation of drive shaft 24, and to facilitate limiting an upward movement of drive shaft 24 in the direction of upward force 120. More specifically, restraint assembly 136 is coupled to second end 70 of drive shaft 24, and to support frame 16 to transfer upward force 120 to support frame 16, such that gearbox 28 is not subjected to upward force 120 from drive shaft 24. Additionally, drive shaft locking assembly 134 is coupled to shaft first end 68, and to support frame 16 to facilitate limiting a rotation of drive shaft 24.

In the exemplary embodiment, restraint assembly 136 is coupled between first pedestal assembly 58 and second pedestal assembly 60 to facilitate transferring upward force 120 from drive shaft 24 to support frame 16. Restraint assembly 136 includes a first support arm 228, a second support arm 230, an upper member 232, and a lower member 234 that is coupled to upper member 232. Upper member 232 and lower member 234 each extend between first support arm 228 and second support arm 230. First support arm 228 and second support arm 230 each extend outwardly from upper member 232. First support arm 228 is adapted to be coupled to first pedestal assembly 58, and second support arm 230 is adapted to be coupled to second pedestal assembly 60 to facilitate coupling restraint assembly 136 to support frame 16.

In the exemplary embodiment, upper member 232 extends across an upper portion 236 of drive shaft 24, and lower member 234 extends across a lower portion 238 of drive shaft 24. Moreover, upper member 232 and lower member 234 each include an interior surface 240 that has an arcuate shape such that an opening 242 extends through restraint assembly 136 and is defined by corresponding interior surfaces 240. Opening 242 is sized and shaped to receive drive shaft 24 therethrough. In the exemplary embodiment, a plurality of torque clamps 244 are coupled to interior surfaces 240, and are oriented circumferentially about opening 242. Each torque clamp 244 is configured to facilitate coupling restraint assembly 136 to drive shaft 24 via a friction fit to facilitate limiting a movement of drive shaft 24.

In the exemplary embodiment, drive shaft locking assembly 134 includes a rotor lock plate 246, a plurality of coupling flanges 248 that extend outwardly from rotor lock plate 246, a plurality of openings 249 that extend through lock plate 246, and a plurality of rotor lock pin assemblies 250 that extend through rotor lock plate 246 to couple rotor lock plate 246 to rotor locking member 74. Rotor lock plate 246 is coupled to support frame front section 50 and extends across shaft upper portion 236, and between first sidewall 44 and second sidewall 46. In the exemplary embodiment, each plate opening 249 is sized and shaped to receive a corresponding rotor lock pin assembly 250. In addition, drive shaft locking assembly 134 is positioned adjacent rotor locking member 74 such that rotor lock pin assembly 250 is inserted through opening 249, and extends into corresponding opening 76 of rotor locking member 74. In the exemplary embodiment, drive shaft locking assembly 134 is coupled to shaft support bearing 78 such that shaft support bearing 78 supports drive shaft locking assembly 134 from support frame 16. Rotor lock plate 246 extends between a first coupling flange 252 and a second coupling flange 254, and has an arcuate shape such that openings 249 are aligned with corresponding rotor locking disk openings 76. First coupling flange 252 and second coupling flange 254 are each coupled to shaft support bearing 78 such that rotor lock plate 246 is coupled to support frame 16.

In the exemplary embodiment, each rotor lock pin assembly 250 includes a lock pin housing 256, a rotor lock collet 258, and a lock pin 260. Lock pin housing 256 includes a central opening 262 that is sized to receive lock pin 260 therethrough, and is coupled to rotor lock plate 246 such that opening 262 is aligned coaxially with plate opening 249. Collet 258 is positioned within disk opening 76 and is sized to receive lock pin 260 such that collet 258 is positioned between lock pin 260 and rotor locking member 74. Lock pin 260 is inserted through central opening 262, through plate opening 249, and through collet 258. As lock pin 260 is inserted through collet 258, collet 258 expands radially outwardly such that collet 258 forms a friction fit between rotor locking member 74 and lock pin 260 to facilitate limiting movement between rotor locking member 74 and lock pin 260. In one embodiment, drive shaft locking assembly 134 also includes a plurality of friction pads (not shown) coupled to drive shaft 24 to facilitate coupling rotor lock plate 246 to drive shaft 24 via a friction fit to facilitate limiting a rotation of drive shaft 24.

In the exemplary embodiment, shaft support assembly 128 also includes a plurality of braces 264 that are each coupled between restraint assembly 136 and shaft locking assembly 134 to provide structural support for restraint assembly 136 and shaft locking assembly 134.

FIG. 9 is a flow chart of an exemplary method 300 that may be used to maintain components of wind turbine 10. In the exemplary embodiment, method 300 includes coupling 302 lifting assembly 130 between component 114 and lifting device 116 such that component 114 is at least partially supported by lifting device 116 with lifting assembly 130. Moreover, a plurality of lifting legs 140 are coupled 304 between component 114 and lifting device 116, and alignment device 160 is coupled 306 to at least one lifting leg 140. Method 300 also includes adjusting 308 an orientation of component 114 with respect to drive shaft axis 66 to facilitate decoupling component 114 from drive shaft 24. More specifically, method 300 includes adjusting 310 a length of lifting leg 140 to adjust the orientation of component 114. Component 114 is then positioned 312 along drive shaft axis 66 and away from drive shaft 24 to decouple component 114 from drive shaft 24. In the exemplary embodiment, method 300 also includes coupling 314 drive shaft locking assembly 134 to drive shaft 24 to facilitate limiting a rotation of the drive shaft. In addition, restraint assembly 136 is coupled 316 to drive shaft 24 to facilitate limiting an upward movement of the drive shaft.

The above-described systems and methods facilitate removing and/or replacing a gearbox uptower of the wind turbine without requiring removal of the nacelle, the rotor, and/or the drive shaft. The ability to remove and/or replace the gearbox without removing the nacelle, the rotor, and/or the drive shaft from the wind turbine eliminates the need for large lifting cranes required to move the rotor and/or the nacelle. As such, the cost and manpower required to remove and/or replace the gearbox from a wind turbine is significantly reduced.

Exemplary embodiments of systems and methods for assembling a gearbox handling assembly for use in a wind turbine are described above in detail. The systems and methods are not limited to the specific embodiments described herein, but rather, components of the assemblies and/or steps of the methods may be utilized independently and separately from other components and/or steps described herein. For example, the methods may also be used in combination with other wind turbine components, and are not limited to practice with only the gearbox systems as described herein. Rather, the exemplary embodiment can be implemented and utilized in connection with many other wind turbine applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A component handling system for use in a wind turbine, the wind turbine including a rotor, a drive train assembly supported from a support frame, and a drive shaft rotatably coupled between the rotor and the drive train assembly, said component handling system comprising:
   a lifting assembly removably coupled to a component of the drive train and a lifting device, said lifting assembly configured to support the component from the lifting device, said lifting assembly comprising:
      a plurality of lifting legs extending between the component and the lifting device, each lifting leg of said plurality of lifting legs having a first end, an opposite second end, and a length defined therebetween;
      an alignment device coupled to at least one said lifting leg of said plurality of lifting legs, said alignment device configured to adjust a length of said at least one lifting leg to adjust an orientation of the component with respect to the drive shaft; and,
   a positioning assembly coupled to the component and to the support frame, said positioning assembly comprising:
      at least one adjustable aft positioning member coupled to a component aft portion, said at least one adjustable aft positioning member configured to bias the component away from the drive shaft; and,
      at least one adjustable forward positioning member coupled to a component forward portion, said at least one adjustable forward positioning member configured to bias the component towards the drive shaft.

2. A component handling system in accordance with claim 1, wherein said at least one adjustable aft positioning member comprises a first aft positioning member and a second aft positioning member which are separately adjustable and configured to rotate the component.

3. A component handling system in accordance with claim 1, wherein said at least one adjustable forward positioning member comprises a first forward positioning member and a second forward positioning member which are separately adjustable and configured to rotate the component.

4. A component handling system in accordance with claim 1, further comprising a shaft support assembly removably coupled to the drive shaft, said shaft support assembly configured to facilitate limiting a movement of the drive shaft.

5. A component handling system in accordance with claim 4, wherein the drive shaft includes a rotor locking member, said shaft support assembly comprises a drive shaft locking assembly adapted to be coupled to the rotor locking member to facilitate limiting a rotation of the drive shaft.

6. A component handling system in accordance with claim 1, further comprising at least one lifting cylinder coupled to the component and configured to adjust an orientation of the component about a component axis.

7. A component handling system in accordance with claim 1, further comprising a control system coupled to said lifting assembly, said control system configured to selectively position the component at a first position wherein the component is operatively coupled to the drive shaft at a second position wherein the component is operatively decoupled and spaced from the drive shaft, and at any position therebetween.

8. A component handling system for use in a wind turbine, the wind turbine including a rotor, a drive train assembly supported from a support frame, and a drive shaft rotatably coupled between the rotor and the drive train assembly, said component handling system removably coupled to a component of the drive train and a lifting device, and configured to adjust an orientation of the component within multiple planes to facilitate removing the component from the wind turbine without removing the rotor from the wind turbine, said component system comprising a positioning assembly including an actuator that is coupled to the component and to the support frame and configured to move the component along a longitudinal axis with respect to the drive shaft.

9. A component handling system in accordance with claim 8, further comprising a lifting assembly removably coupled to the component and the lifting device for supporting the component from the lifting device.

10. A component handling system in accordance with claim 9, wherein said lifting assembly comprises a plurality of lifting legs extending between the component and the lifting device, each lifting leg of said plurality of lifting legs comprising a first end, an opposite second end, and a length defined therebetween.

11. A component handling system in accordance with claim 10, wherein said lifting assembly further comprises an alignment device coupled to at least one said lifting leg of said plurality of lifting legs, said alignment device configured to adjust a length of said at least one lifting leg to adjust an orientation of the component with respect to said drive shaft.

12. A component handling system in accordance with claim 8, wherein the component extends between a forward portion and an aft portion, said positioning assembly comprises at least one aft positioning member coupled to the component aft portion, said at least one aft positioning member configured to bias the component away from the drive shaft.

13. A component handling system in accordance with claim 12, wherein said positioning assembly comprises at least one forward positioning member coupled to the component forward portion, said at least one forward positioning member configured to bias the component towards the drive shaft.

14. A component handling system in accordance with claim 8, further comprising a control system configured to selectively position the component at a first position wherein the component is operatively coupled to said drive shaft, at a second position wherein the component is operatively decoupled and spaced from said drive shaft, and at any position therebetween.

15. A method of maintaining a drive train assembly of a wind turbine wherein the wind turbine includes a drive shaft at least partially inserted through a component of the drive train assembly, said method comprising:
   coupling a lifting assembly to the component and a lifting device such that the component is at least partially supported by the lifting device;
   adjusting an orientation of the component with respect to a centerline axis of the drive shaft to facilitate decoupling the component from the drive shaft;
   positioning the component along the centerline axis and away from the drive shaft to decouple the component from the drive shaft; and,
   coupling an aft positioning member to an aft component portion and a forward positioning member to a forward component portion and separately adjusting the aft positioning member and the forward positioning member to rotate the component with respect to the drive shaft.

16. A method in accordance with claim 15, further comprising:
   coupling a plurality of lifting legs between the component and the lifting device;
   coupling an alignment device to at least one lifting leg of the plurality of lifting legs; and,
   adjusting a length of the at least one lifting leg to adjust an orientation of the component with respect to the drive shaft.

17. A method in accordance with claim 15, further comprising coupling a drive shaft locking assembly to the drive shaft to facilitate limiting a rotation of the drive shaft.

18. A method in accordance with claim 15, further comprising coupling a restraint assembly to the drive shaft to facilitate limiting an upward movement of the drive shaft.

* * * * *